United States Patent
Jobanputra et al.

(10) Patent No.: US 9,479,585 B1
(45) Date of Patent: Oct. 25, 2016

(54) POLICY BASED SERVICE MANAGEMENT IN A CLUSTERED NETWORK STORAGE SYSTEM

(75) Inventors: Varun Jobanputra, Mountain View, CA (US); Ravi Wijayaratne, San Jose, CA (US); Ashok Dwarakinath, Santa Clara, CA (US); Atul Ramesh Pandit, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 1310 days.

(21) Appl. No.: 12/835,530

(22) Filed: Jul. 13, 2010

(51) Int. Cl.
*G06F 15/173* (2006.01)
*H04L 29/08* (2006.01)
*G06F 17/30* (2006.01)

(52) U.S. Cl.
CPC ..... *H04L 67/1097* (2013.01); *G06F 17/30082* (2013.01)

(58) Field of Classification Search
CPC ............... H04L 67/1097; H04L 63/10; H04L 63/0227; G06F 17/30082
USPC ........................................ 709/223–224, 226
See application file for complete search history.

(56) References Cited

U.S. PATENT DOCUMENTS

| | | | |
|---|---|---|---|
| 7,577,729 B1* | 8/2009 | Umbehocker et al. | 709/223 |
| 2004/0199566 A1* | 10/2004 | Carlson et al. | 709/201 |
| 2004/0243692 A1* | 12/2004 | Arnold et al. | 709/220 |
| 2004/0243699 A1* | 12/2004 | Koclanes et al. | 709/224 |
| 2008/0072229 A1* | 3/2008 | Kirton et al. | 718/104 |
| 2009/0113420 A1* | 4/2009 | Pawlowski | 718/1 |
| 2009/0144422 A1* | 6/2009 | Chatley et al. | 709/226 |

\* cited by examiner

*Primary Examiner* — Minh-Chau Nguyen
(74) *Attorney, Agent, or Firm* — Gilliam IP PLLC

(57) ABSTRACT

A clustered network storage system includes a policy based storage efficiency management framework to allow users to more efficiently manage storage efficiency attributes on a plurality of storage objects in the clustered network storage system. The storage efficiency management framework includes a policy database for storing a plurality of polices, each of which includes a plurality of attributes. Each storage object in the clustered network storage system is assigned a policy. Storage efficiency operations can then be initiated by a storage efficiency engine according to the policies assigned to the storage objects by sending a single trigger to each node in the clustered network storage system and the storage efficiency engine determining on which storage objects to perform the storage efficiency operations.

17 Claims, 10 Drawing Sheets

POLICY BASED SERVICE MANAGEMENT IN A CLUSTERED NETWORK STORAGE SYSTEM

FIELD OF THE INVENTION

At least one embodiment of the present invention pertains to network storage systems, and more particularly, to policy based management of storage efficiency operations of a node of a clustered network storage system.

BACKGROUND

A storage controller is a physical processing device that is used to store and retrieve data on behalf of one or more hosts. A network storage controller can be configured (e.g., by "hardwiring", software, firmware, or any combination thereof) to operate as a storage server that serves one or more clients on a network, to store and manage data in a set of mass storage devices, such as magnetic or optical storage-based disks, tapes, or flash memory. Some storage servers are designed to service file-level requests from hosts, as is commonly the case with file servers used in a network attached storage (NAS) environment. Other storage servers are designed to service block-level requests from hosts, as with storage servers used in a storage area network (SAN) environment. Still other storage servers are capable of servicing both file-level requests and block-level requests, as is the case with certain storage servers made by NetApp®, Inc. of Sunnyvale, Calif., employing the Data ONTAP® storage operating system.

As storage systems become larger, in order to accommodate the need for more capacity, several problems arise. Particularly, the efficient use of storage space becomes more difficult. One problem in particular is duplicate data. A typical data volume can contain thousands or even millions of duplicate data objects. As data is created, distributed, backed up, and archived, many duplicate data objects are commonly created as an incidental result of these operations. The end result is inefficient utilization of data storage resources. Deduplication operations identify and eliminate the undesired duplicate data objects. Commonly, this is done by deleting all but one copy of a given data object and replacing all duplicates of that data object with a reference to the singe remaining data object. Compression operations reduce the amount of physical storage space used to store a particular data segment. Storage efficiency operations, such as deduplication and compression, provide a benefit in storage space efficiency. The result can be reduced operation cost due to longer intervals between storage capacity upgrades and more efficient management of stored data.

A network storage system can have a simple architecture; for example, an individual storage server can provide one or more clients on a network with access to data stored in a mass storage subsystem. Recently, however, with storage capacity demands increasing rapidly in almost every business sector, there has been a trend towards the use of clustered network storage systems, to improve scalability.

In a clustered storage system, two or more storage server "nodes" are connected in a distributed architecture. The nodes are generally implemented by two or more storage controllers. Each storage server "node" is in fact a storage server, although it is implemented with a distributed architecture. For example, a storage server node can be designed to include a network module ("N-module") to provide network connectivity and a separate data module (e.g., "D-module") to provide data storage and data access functionality, where the N-module and D-module communicate with each other over some type of physical interconnect. Two or more such storage server nodes are typically connected to form a storage "cluster", where each of the N-modules in the cluster can communicate with each of the D-modules in the cluster.

A clustered architecture allows convenient scaling through the addition of more N-modules and D-modules, all capable of communicating with each other. Further, a storage cluster may present a single system image of stored data to clients and administrators, such that the actual location of data can be made transparent to clients and administrators. An example of a storage controller that is designed for use in a clustered system such as this is a storage controller employing NetApp's Data ONTAP® GX storage operating system.

Efficient use of storage space is also a concern in a clustered storage system, and in fact, the problem can even be magnified due to the distributed architecture of the clustered storage system. A large cluster can have dozens or even hundreds of nodes, containing tens of thousands of volumes. Because of the distributed architecture, the storage that a client accesses may not all be controlled by the same D-module. Further, a single D-module can control storage accessed by multiple clients and managed by administrators in multiple locations. Storage efficiency operations, e.g., deduplication and compression, can be performed by the D-module to improve the way storage space is used. An administrator may request storage efficiency operations to be performed by a number of D-modules which are responsible for maintaining the storage devices associated with a client.

Configuring storage efficiency operations for a volume (an abstraction of physical storage devices) typically involves manually assigning a large number of attributes to the volume. For example, a deduplication option (whether data on the volume should be deduplicated), a compression option (whether data on the volume should be compressed), a compression and/or deduplication schedule, a duration of the compression and/or deduplication operation, an operation type (background vs. foreground), etc. can be set for each volume. These attributes can be set for a particular volume depending on various factors, such as the expected type of workload, performance requirements, characteristics of the data set, availability of CPU power, backup schedules, etc.

With conventional technology, all of these attributes are assigned individually for each volume in the storage system. This is true even in cases where the same configuration is valid for multiple volumes. Thus, scalability challenges arise in administering storage efficiency operations in a clustered network storage environment. A large cluster can include tens of thousands of volumes. Individually configuring storage efficiency attributes of storage efficiency operations for such a large number of volumes can be very time-consuming and burdensome.

SUMMARY

The techniques introduced here provide a way to encapsulate storage efficiency operation attributes that are relevant to multiple storage objects, e.g., volumes, in a single policy so as to facilitate a more efficient process for assigning storage efficiency operation attributes. A single instance of this policy can then be assigned to each volume in the cluster. Assigning the same policy to multiple volumes enables a consistent storage efficiency strategy to be carried out for each of the volumes without requiring separate configuration of each volume. Configuring a new volume with an existing policy enables the new volume to automatically inherit all of the storage efficiency operation attributes of the policy. If the storage efficiency requirements change, only a single policy needs to be changed, and the change is automatically propagated to every volume to which that policy is assigned.

Further, policy based management can also be integrated with a role-based access control (RBAC) model, for example, where an administrator of a virtual server has read-only access to a predefined set of policies created by a cluster administrator. This allows a cluster administrator to delegate the task of managing storage efficiency operations to one or more virtual server administrators while maintaining the necessary constraints for efficient cluster management.

The techniques introduced here also provide an efficient method for initiating policy related actions. Communication efficiency is achieved by sending a single trigger message per node for communications between a management module and the volumes associated with a policy. The trigger message is sent to the data module of each node in the clustered network storage system where the data module determines, based on the content of the trigger message, which volumes to run storage efficiency operations on. This approach improves CPU and bandwidth utilization and is particularly advantageous when the communication takes place over a wide area network (WAN).

Other aspects of the techniques summarized above will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Network Storage Environment

Figure 1:
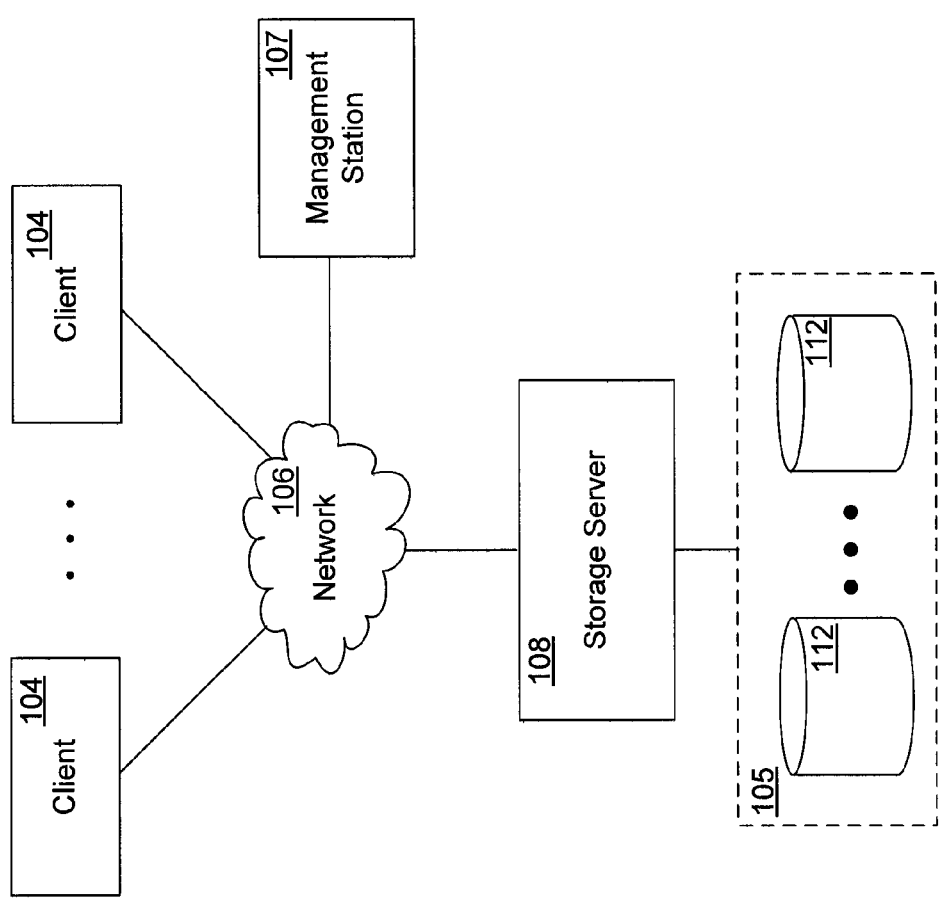
FIG. 1 illustrates a non-clustered network storage system.

FIG. 1 shows an example of a non-clustered network storage system, which includes a plurality of client systems 104, a storage server 108, and computer network 106 connecting the client systems 104 and the storage server 108. As shown in FIG. 1, a storage controller configured as a storage server 108 is coupled to a number of mass storage devices 112, such as disks, in a mass storage subsystem 105. Alternatively, some or all of the mass storage devices 112 can be other types of storage, such as flash memory, solid-state drives (SSDs), tape storage, etc. The mass storage devices 112 are assumed to be disks herein only to simplify this description.

The storage server 108 can be, for example, one of the FAS-series of storage server products available from NetApp, Inc. The client systems 104 are connected to the storage server 108 via the computer network 106, which can be a packet-switched network, for example, a local area network (LAN) or wide area network (WAN). Further, the storage server 108 can be connected to the disks 112 via a switching fabric (not shown), which can be a fiber distributed data interface (FDDI) network, for example. It is noted that, within the network data storage environment, any other suitable number of storage servers and/or mass storage devices, and/or any other suitable network technologies, may be employed.

The storage server 108 can make some or all of the storage space on the disk(s) 112 available to the client systems 104 in a conventional manner. For example, each of the disks 112 can be implemented as an individual disk, multiple disks (e.g., a RAID group) or any other suitable mass storage device(s). The storage server 108 can communicate with the client systems 104 according to well-known protocols, such as the Network File System (NFS) protocol or the Common Internet File System (CIFS) protocol, to make data stored on the disks 112 available to users and/or application programs. The storage server 108 can present or export data stored on the disks 112 as volumes and/or qtrees, to each of the client systems 104. Various functions and configuration settings of the storage server 108 can be controlled by a user, e.g., a storage administrator, from a management station 107 coupled to the network 106.

The storage server 108 can include a storage efficiency framework to manage the storage efficiency operations on the disks 112. This storage efficiency framework can include a storage efficiency engine (not shown) to perform, for example, deduplication and compression operations, to more efficiently use storage space on the disks.

Figure 2:
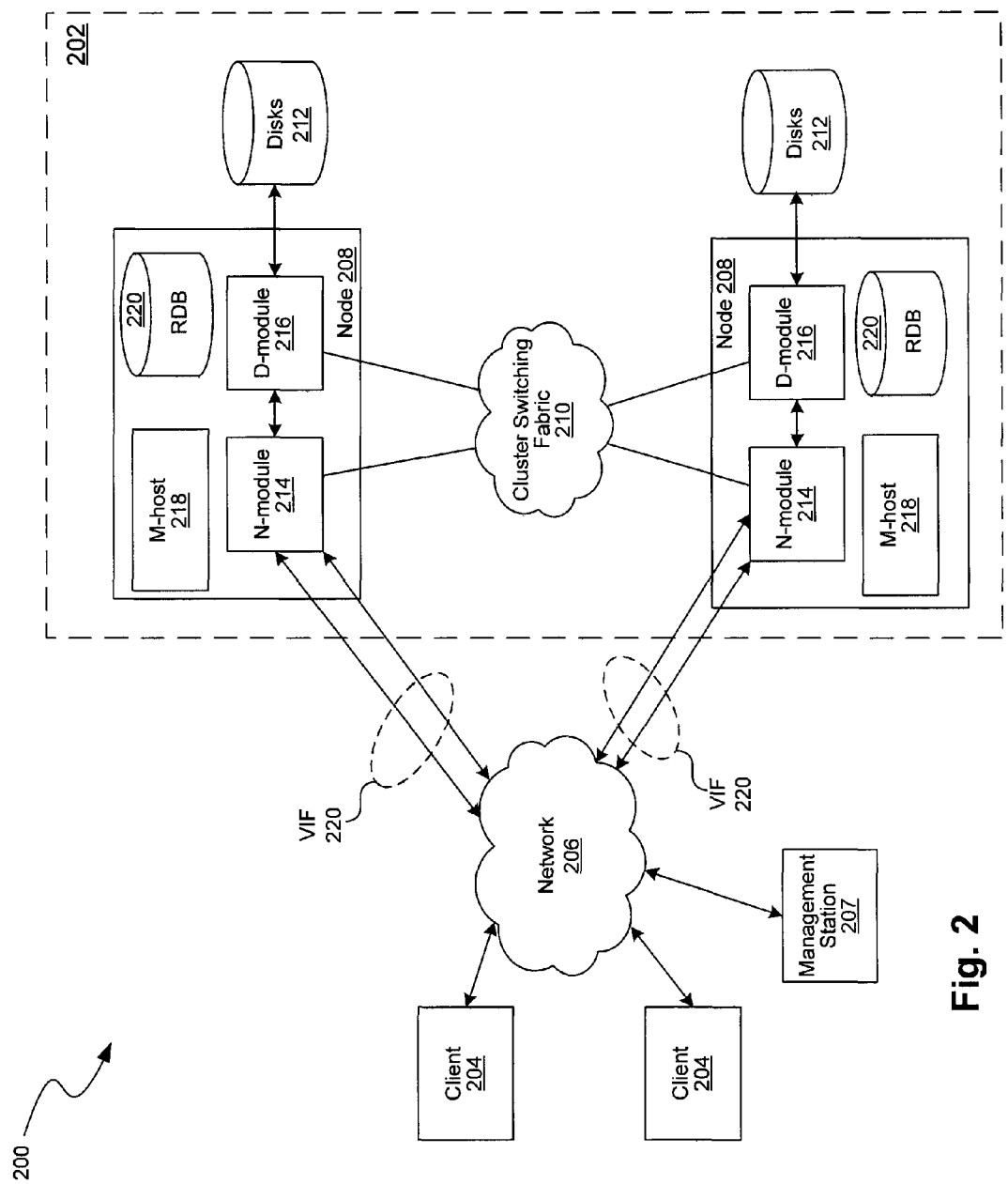
FIG. 2 illustrates a clustered network storage system.

FIG. 2 shows an example of a clustered network storage system. The system 200 includes a plurality of client systems 204, a clustered storage server system 202 ("cluster"), and a computer network 206 connecting the client systems 204 and the clustered storage server system 202. As shown in FIG. 2, the clustered storage server system 202 includes a plurality of storage server nodes (or simply "nodes") 208, a cluster switching fabric 210, and a plurality of mass storage devices 212. Alternatively, some or all of the mass storage devices 212 can be other types of storage, such as flash memory, SSDs, tape storage, etc. However, to facilitate description, in this example the mass storage devices 212 are assumed to be disks.

Each node 208 essentially provides similar functionality to that of a storage server 108 in FIG. 1. However, unlike the storage servers 108 in FIG. 1, the nodes 208 are not operated and managed as distinct independent entities. Rather, they are operated and managed collectively as a single entity, i.e., a cluster 202. The cluster presents to users and administrators a single system image of all data stored by the cluster, regardless of where any particular data resides within the cluster.

Each of the nodes 208 is configured to include several modules, including an N-module 214, a D-module 216, and an M-host 218 (each of which can be implemented by using a separate software module) and an instance of a replicated database (RDB) 220. RDB 220 can be implemented as a number of individual databases, each of which has an instance located in each of the nodes 208. The N-modules 214 include functionality that enables their respective nodes 208 to connect to one or more of the client systems 204 over the network 206, while the D-modules 216 provide access to the data stored on their respective disks 212. The M-hosts 218 provide management functions for the clustered storage server system 202, including user interface functionality to enable an administrator to manage and control the cluster. Accordingly, each of the server nodes 208 in the clustered storage server arrangement provides the functionality of a storage server.

The RDB 220 is a database that is replicated throughout the cluster, i.e., each node 208 includes an instance of the RDB 220. The various instances of the RDB 220 are updated regularly to bring them into synchronization with each other. The RDB 220 provides cluster-wide storage of various information used by all of the nodes 208 and includes a volume location database (VLDB). The VLDB indicates the location within the cluster of each volume (of data) in the cluster (i.e., the owning D-module 216 for each volume) and is used by the N-modules 214 to identify the appropriate D-module 216 for any given volume to which access is requested. Each volume in the system is represented by a data set identifier (DSID) and a master data set identifier (MSID), each of which is stored in two places: on disk in the volume itself and in the VLDB. The DSID is a system internal identifier of a volume. The MSID is an external identifier for a volume, used in file handles (e.g., NFS) and the like. The VLDB stores the identity and mapping (MSIDs-to-DSIDs) of all volumes in the system.

The nodes 208 are interconnected by a cluster switching fabric 210, which can be embodied as a Gigabit Ethernet switch, for example. The N-modules 214 and D-modules 216 cooperate to provide a highly-scalable, distributed storage system architecture of a clustered computing environment implementing exemplary embodiments of the present invention. Note that while there is shown an equal number of N-modules and D-modules in FIG. 2, there may be differing numbers of N-modules and/or D-modules in accordance with various embodiments of the technique described here. For example, there need not be a one-to-one correspondence between the N-modules and D-modules. As such, the description of a node 208 comprising one N-module and one D-module should be understood to be illustrative only.

Various functions and configuration settings of the cluster 202 can be controlled by a user, e.g., a storage administrator, from a management station 207 coupled to the network 206. A plurality of virtual interfaces (VIFs) 222 allow the disks 212 associated with the nodes 208 to be presented to the client systems 204 as a single shared storage pool. FIG. 2 depicts only the VIFs at the interfaces to the N-modules 214 for clarity of illustration.

Figure 3:
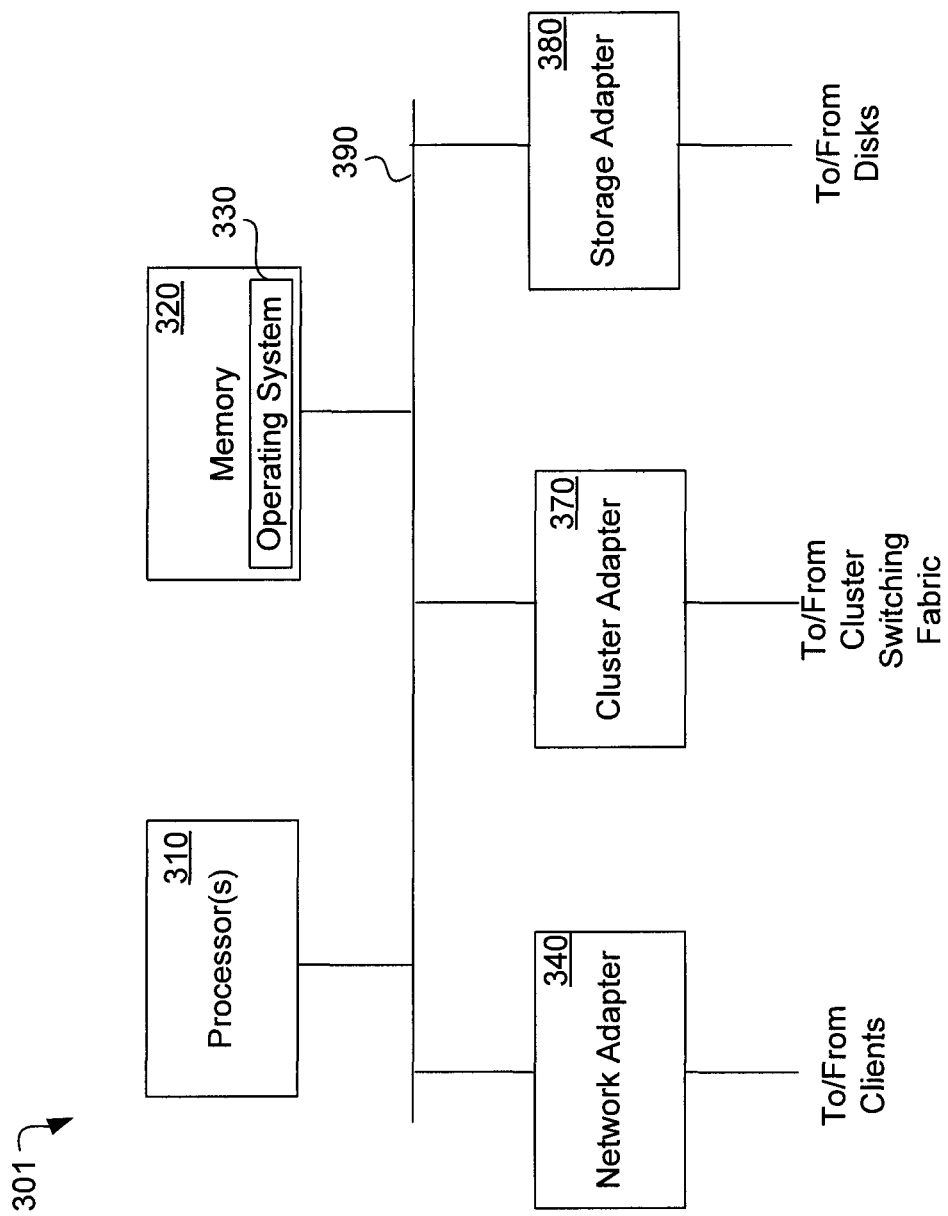
FIG. 3 is a high-level block diagram showing an example of the hardware architecture of a storage controller.

FIG. 3 is a diagram illustrating an example of a storage controller that can implement one or more storage servers 108, or one or more storage server nodes 208. In an exemplary embodiment, the storage controller 301 includes a processor subsystem 310 that includes one or more processors. The storage controller 301 further includes a memory 320, a network adapter 340, a cluster access adapter 370 and a storage adapter 380, all interconnected by an interconnect 390. The cluster access adapter 370 includes a plurality of ports adapted to couple the node 208 to other nodes 208 of the cluster. In the illustrated embodiment, Ethernet is used as the clustering protocol and interconnect media, although other types of protocols and interconnects may be utilized within the cluster architecture described herein. In alternative embodiments where the N-modules and D-modules are implemented on separate storage systems or computers, the cluster access adapter 270 is utilized by the N-module 214 and/or D-module 216 for communicating with other N-modules and/or D-modules of the cluster.

The storage controller 301 can be embodied as a single- or multi-processor storage system executing a storage operating system 330 that preferably implements a high-level module, called a storage manager, to logically organize the information as a hierarchical structure of named directories, files, and special types of files called virtual disks (hereinafter generally "blocks") on the disks. Illustratively, one processor 310 can execute the functions of the N-module 214 on the node 208 while another processor 310 executes the functions of the D-module 216.

The memory 320 illustratively comprises storage locations that are addressable by the processors 310 and adapters 340, 370, 380 for storing software program code and data associated with the present invention. The processor 310 and adapters may, in turn, comprise processing elements and/or logic circuitry configured to execute the software code and manipulate the data structures. The storage operating system 330, portions of which are typically resident in memory and executed by the processing elements, functionally organizes the storage controller 301 by (among other things) invoking storage operations in support of the storage service provided by the node 208. It will be apparent to those skilled in the art that other processing and memory implementations, including various computer readable storage media, may be used for storing and executing program instructions pertaining to the technique introduced here.

The network adapter 340 includes a plurality of ports to couple the storage controller 301 to one or more clients 204 over point-to-point links, wide area networks, virtual private networks implemented over a public network (Internet) or a shared local area network. The network adapter 340 thus can include the mechanical, electrical and signaling circuitry needed to connect the storage controller 301 to the network 206. Illustratively, the network 206 can be embodied as an Ethernet network or a Fibre Channel (FC) network. Each client 204 can communicate with the node 208 over the network 206 by exchanging discrete frames or packets of data according to pre-defined protocols, such as TCP/IP.

The storage adapter 380 cooperates with the storage operating system 330 to access information requested by the clients 204. The information may be stored on any type of attached array of writable storage media, such as magnetic disk or tape, optical disk (e.g., CD-ROM or DVD), flash memory, solid-state drive (SSD), electronic random access memory (RAM), micro-electro mechanical and/or any other similar media adapted to store information, including data and parity information. However, as illustratively described herein, the information is stored on disks 212. The storage adapter 380 includes a plurality of ports having input/output (I/O) interface circuitry that couples to the disks over an I/O interconnect arrangement, such as a conventional high-performance, Fibre Channel (FC) link topology.

Storage of information on disks 212 can be implemented as one or more storage volumes that include a collection of physical storage disks cooperating to define an overall logical arrangement of volume block number (VBN) space on the volume(s). The disks 212 can be organized as a RAID group. One or more RAID groups together form an aggregate. An aggregate can contain one or more volumes/file systems.

The storage operating system 330 facilitates clients' access to data stored on the disks 212. In certain embodiments, the storage operating system 330 implements a write-anywhere file system that cooperates with one or more virtualization modules to "virtualize" the storage space provided by disks 212. In certain embodiments, a storage manager 460 (FIG. 4) logically organizes the information as a hierarchical structure of named directories and files on the disks 212. Each "on-disk" file may be implemented as set of disk blocks configured to store information, such as data, whereas the directory may be implemented as a specially formatted file in which names and links to other files and directories are stored. The virtualization module(s) allow the storage manager 460 to further logically organize information as a hierarchical structure of blocks on the disks that are exported as named logical unit numbers (LUNs).

Figure 4:
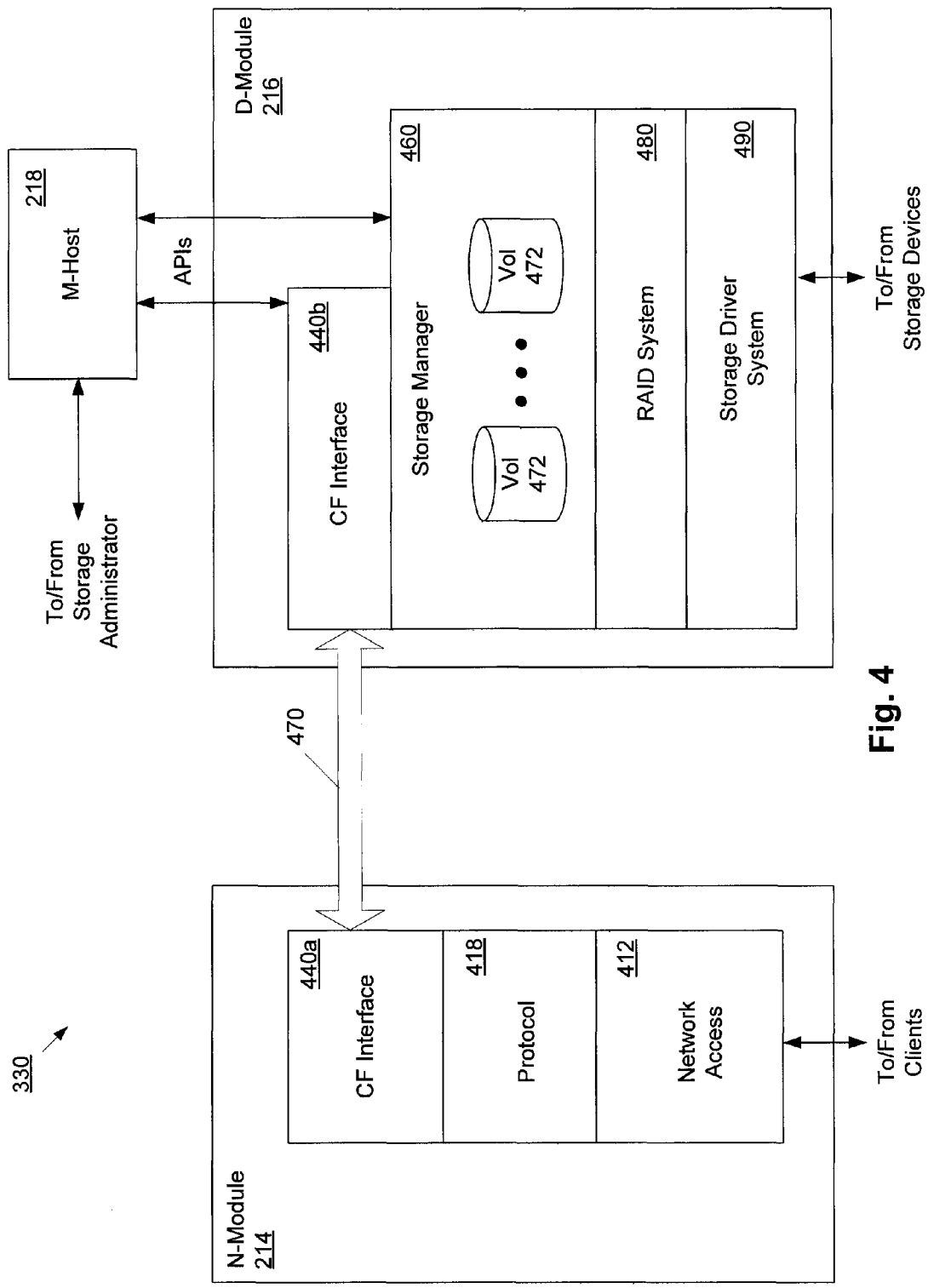
FIG. 4 illustrates an example of a storage operating system of a storage server node in a clustered network storage system.

FIG. 4 illustrates an example of the storage operating system 330, which can be used in a clustered environment such as shown in FIG. 2. In the illustrated embodiment the storage operating system 330 implements the N-module 214, D-module 216 and M-host 218, as described above. The modules may be implemented on the same or separate storage systems or computers. The N-module 214 includes multiple functional layers organized to form an integrated network protocol stack. The network protocol stack provides data paths for clients to access information stored on the node using block and file access protocols. The network protocol stack in combination with underlying processing hardware forms the N-module 214.

The network protocol stack in the N-module 214 includes a network access layer 412 which includes one or more network drivers that implement one or more lower-level protocols to enable the processing system to communicate over the network 206, such as Ethernet, Internet Protocol (IP), Transport Control Protocol/Internet Protocol (TCP/IP), Fibre Channel Protocol (FCP) and/or User Datagram Protocol/Internet Protocol (UDP/IP). The network protocol stack also includes a multi-protocol layer 418 which implements various higher-level network protocols, such as Network File System (NFS), Common Internet File System (CIFS), Hypertext Transfer Protocol (HTTP), Internet small computer system interface (iSCSI), etc. Further, the network protocol stack includes a cluster fabric (CF) interface module 440a which implements intra-cluster communication with D-modules and with other N-modules.

In addition, the storage operating system 330 includes a set of data access layers organized to provide data paths for accessing information stored on the disks 212 of the node 208; these layers in combination with underlying processing hardware forms the D-module 216. To that end, the data access layers include a storage manager module 460 that manages any number of volumes 472, a RAID system module 480 and a storage driver system module 490.

The storage manager 460 primarily manages a file system (or multiple file systems) and serves client-initiated read and write requests. The RAID system 480 manages the storage and retrieval of information to and from the volumes/disks in accordance with a RAID redundancy protocol, such as RAID-4, RAID-5, or RAID-DP, while the disk driver system 490 implements a disk access protocol such as SCSI protocol or FCP.

The data access layers also include a cluster fabric (CF) interface module 440b to implement intra-cluster communication link 470 with N-modules and/or other D-modules. The nodes 208 in the cluster 202 can cooperate, through their respective CF interface modules 440a and 440b, to provide a single file system image across all D-modules 216 in the cluster 202. Stated another way, the various D-modules 216 can implement multiple distinct file systems within a single global namespace. A "namespace" in this context is a set of names that map to named objects (e.g., files, directories, logical units). "Global" means that each name is independent of the physical location of the corresponding object. A global namespace therefore applies at least across an entire cluster, and potentially can be extended to apply to multiple clusters. Thus, any N-module 214 that receives a client request can access any data container within the single file system image located on any D-module 216 of the cluster, and the location of that data container can remain transparent to the client and user.

The CF interface modules 440 implement the CF protocol to communicate file system commands among the modules of cluster 202 over the cluster switching fabric 210 (FIG. 2). Such communication can be effected by a D-module exposing a CF application programming interface (API) to which an N-module (or another D-module) issues calls. To that end, a CF interface module 440 can be organized as a CF encoder/decoder. The CF encoder of, e.g., CF interface 440a on N-module 214 can encapsulate a CF message as (i) a local procedure call (LPC) when communicating a file system command to a D-module 216 residing on the same node or (ii) a remote procedure call (RPC) when communicating the command to a D-module residing on a remote node of the cluster. In either case, the CF decoder of CF interface 440b on D-module 216 de-encapsulates the CF message and processes the file system command.

In operation of a node 208, a request from a client 204 is forwarded as a packet over the network 206 and onto the node 208, where it is received at the network adapter 340 (FIG. 3). A network driver of layer 412 processes the packet and, if appropriate, passes it on to a network protocol and file access layer for additional processing prior to forwarding to the storage manager 460. At that point, the storage manager 460 generates operations to load (retrieve) the requested data from disk 212 if it is not resident in memory 320. If the information is not in memory 320, the storage manager 460 indexes into a metadata file to access an appropriate entry and retrieve a logical VBN. The storage manager 460 then passes a message structure including the logical VBN to the RAID system 480; the logical VBN is mapped to a disk identifier and disk block number (DBN) and sent to an appropriate driver (e.g., SCSI) of the disk driver system 490.

The disk driver accesses the DBN from the specified disk 212 and loads the requested data block(s) in memory for processing by the node. Upon completion of the request, the node (and operating system) returns a reply to the client 204 over the network 206.

The data request/response "path" through the storage operating system 330 as described above can be implemented in general-purpose programmable hardware executing the storage operating system 330 as software or firmware. Alternatively, it can be implemented at least partially in specially designed hardware. That is, in an alternate embodiment of the invention, some or all of the storage operating system 330 is implemented as logic circuitry embodied within a field programmable gate array (FPGA) or an application specific integrated circuit (ASIC), for example.

The N-module 214 and D-module 216 can be implemented as processing hardware configured by separately-scheduled processes of storage operating system 330. In an alternate embodiment, the modules may be implemented as processing hardware configured by code within a single operating system process. Communication between an N-module 214 and a D-module 216 is thus illustratively effected through the use of message passing between the modules although, in the case of remote communication between an N-module and D-module of different nodes, such message passing occurs over the cluster switching fabric 210. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF API.

The operating system 330 also includes M-host 218, which provides management functions for the cluster 202, including user interface functionality to enable an administrator to manage and control the cluster 202 (e.g., through management station 207). Because each node 208 in the cluster 202 has an M-host 218, the cluster 202 can be managed via the M-host 218 in any node 208 in the cluster 202. The functionality of an M-host 218 includes generating a user interface, such as a graphical user interface (GUI) and/or a command line interface (CLI), for a storage network administrator. The functionality of an M-host 218 can also include facilitating the provisioning of storage, creating and destroying volumes, installation of new software, controlling access privileges, scheduling and configuring data backups, storage efficiency management, scheduling data mirroring function, and other functions. The M-host 218 communicates with its local D-module 214 or with any remote D-module by using a set of APIs. The M-host 218 includes network interfaces (not shown) to communicate with D-modules and to communicate with one or more external computers or input/output terminals used by network administrators.

Policy Based Storage Efficiency Management Framework

Figure 5:
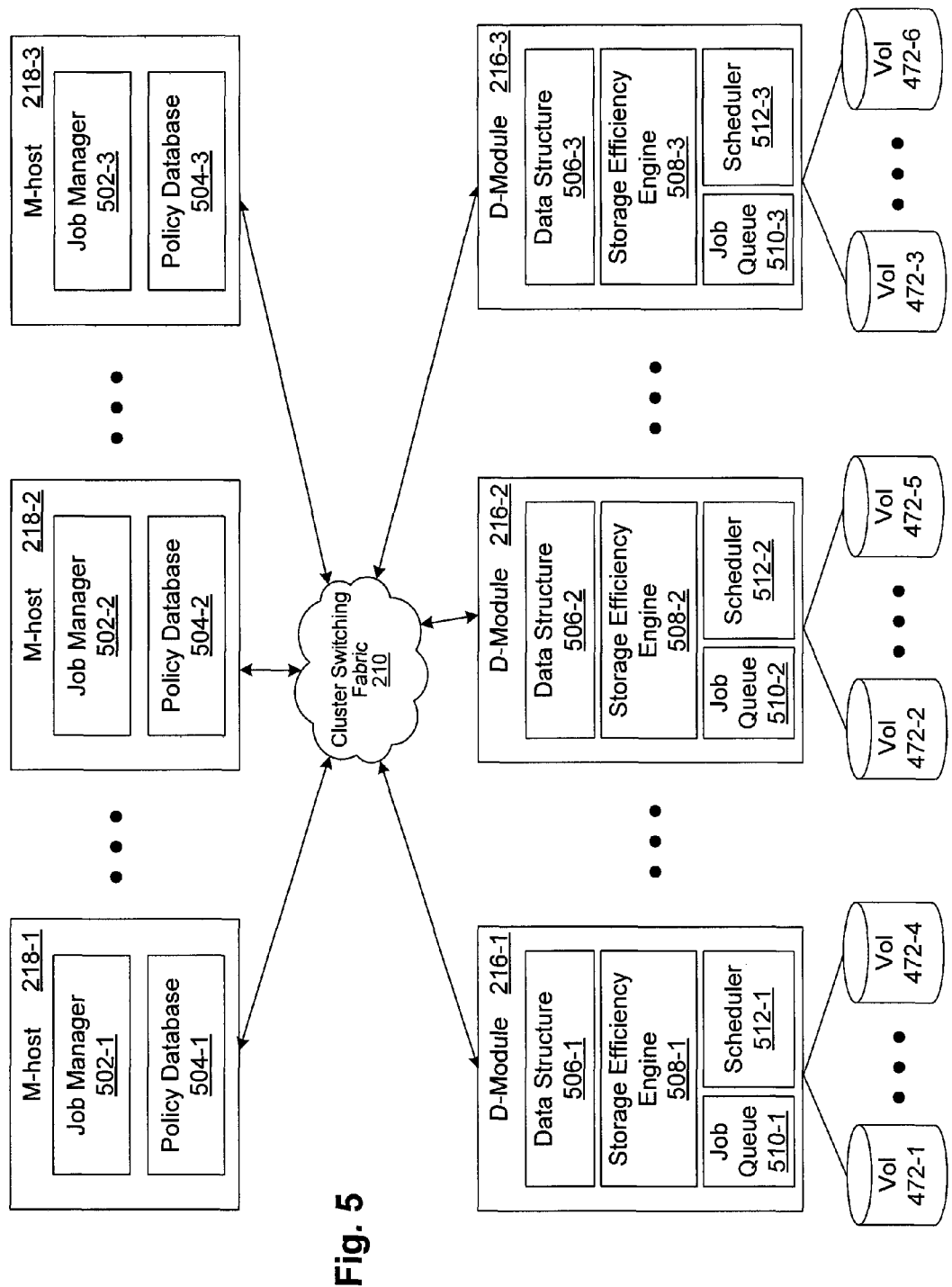
FIG. 5 illustrates an example of a policy based storage efficiency management framework implemented in a clustered network storage system.

FIG. 5 shows an example of a clustered network storage system according to the techniques introduced here. The clustered network storage system in FIG. 5 is abbreviated to show only a plurality of M-hosts 218 and a plurality of D-modules 216 connected through a cluster switching fabric 210. However, other components necessary for proper functioning of the cluster, but which are not germane to this description (e.g., N-modules) are assumed to be present. The clustered network storage system depicted in FIG. 5 includes a storage efficiency management framework. The storage efficiency management framework includes a job manager 502 and a policy database 504, both of which are implemented in an M-host 218. The storage efficiency management framework further includes a data structure 506, a storage efficiency engine 508, a job queue 510 and a scheduler 512, all of which are implemented on a D-module. The elements of the storage efficiency management framework as depicted in FIG. 5 can be implemented as hardware, software, firmware, or a combination thereof.

As described above with reference to a non-clustered network storage system, each D-module 216 of the clustered network storage system of FIG. 5 includes a storage efficiency engine 508. Each storage efficiency engine 508 can perform, for example, deduplication and/or compression operations to more efficiently use storage space on the storage devices (not shown) owned by D-module 216. The goal of deduplication is to ensure that there is no more than one instance of a particular data segment stored in a volume, thereby reducing the used storage space. The goal of compression is to reduce the amount of physical storage space used to store a particular data segment. These tasks are significantly more difficult in a clustered network storage system, as a volume may be spread over multiple storage devices owned by multiple D-modules 216 in the cluster. The distributed architecture of a clustered network storage system also makes it difficult and time consuming for a network administrator to configure storage efficiency attributes for each volume.

Configuring storage efficiency operations on a volume typically involves manually assigning a large number of storage efficiency operation attributes to the volume. Storage efficiency attributes include, a deduplication option (whether data should be deduplicated), a compression option (whether data should be compressed), a compression and/or deduplication schedule, a duration or stop time of a compression and/or deduplication operation, an operation type, e.g., background, foreground, quality of service requirements, etc. Determining what attribute values should be assigned to a particular volume depends on various factors, such as the type of workload, performance requirements, characteristics of the data set, availability of CPU power, backup schedules, etc. With conventional technology, all of these attributes need to be assigned individually per volume. This is true even in cases where the same configuration is valid for multiple volumes. This introduces scalability challenges in administering storage efficiency in a cluster environment.

The techniques introduced here provide a method to encapsulate, or group together for ease of distribution, storage efficiency attributes, which are relevant to multiple storage objects in the cluster, in a single policy. A single instance of this policy can then be assigned to each storage object in the cluster. While a policy can be assigned to any type of storage object in the cluster (e.g., volume, aggregate, LUN, file, etc.), for ease of explanation the storage object is assumed to be a volume. Assigning the same policy to multiple volumes ensures that a consistent storage efficiency scheme is applied to each volume. Configuring a new volume with an existing policy ensures that the new volume automatically inherits all the attributes of the existing policy. The new volume is thus configured with the same storage efficiency attributes as the other volumes to which the policy is assigned and therefore also consistently applies the storage efficiency scheme. If the storage efficiency requirements change, only a single policy needs to be changed. The change is automatically propagated to every volume to which that policy has been assigned.

Assigning a single policy to each volume, instead of having to assign a number of storage efficiency operation attributes to each volume, to implement storage efficiency operations, greatly simplifies a network administrator's job. For example, if performing compression operations requires more CPU power, a single policy can be created with the compression option turned on, and assigned to all volumes belonging to nodes having a multi-core CPU. Similarly, all volumes that have the same backup schedule can be assigned a policy specifying a convenient deduplication and/or compression schedule and duration. This approach allows a large number of volumes to be grouped and collectively managed for storage efficiency purposes, freeing up valuable time of the network administrator.

As shown in FIG. 5, an M-host 218 includes a job manager 502 and a policy database 504. After a user has created a policy, the policy database 504 stores the policy. The policy database 504 can be included in the replicated database 220 and can thus be manageable from any node in the cluster. The job manager 502 triggers a storage efficiency operation on the volumes of the clustered network storage system using a trigger message sent from a single M-host 218 to each node of the clustered network storage system.

The D-module 216 includes a data structure 506 which includes storage efficiency related information for each of the volumes 472 owned by the D-module 216. The storage efficiency related information includes policy information, e.g., a mapping of which policy is assigned to which volume(s). The policy information can also include storage efficiency operation attribute values. The policy information can also be stored in the volume itself. Volumes 472 in each node are maintained by the D-module 216 in that node. The interaction between the elements of the storage efficiency framework as depicted in FIG. 5 will be described in connection with the following examples of creating and configuring policies, and carrying out storage efficiency operations according to the policies assigned to each volume.

Figure 6:
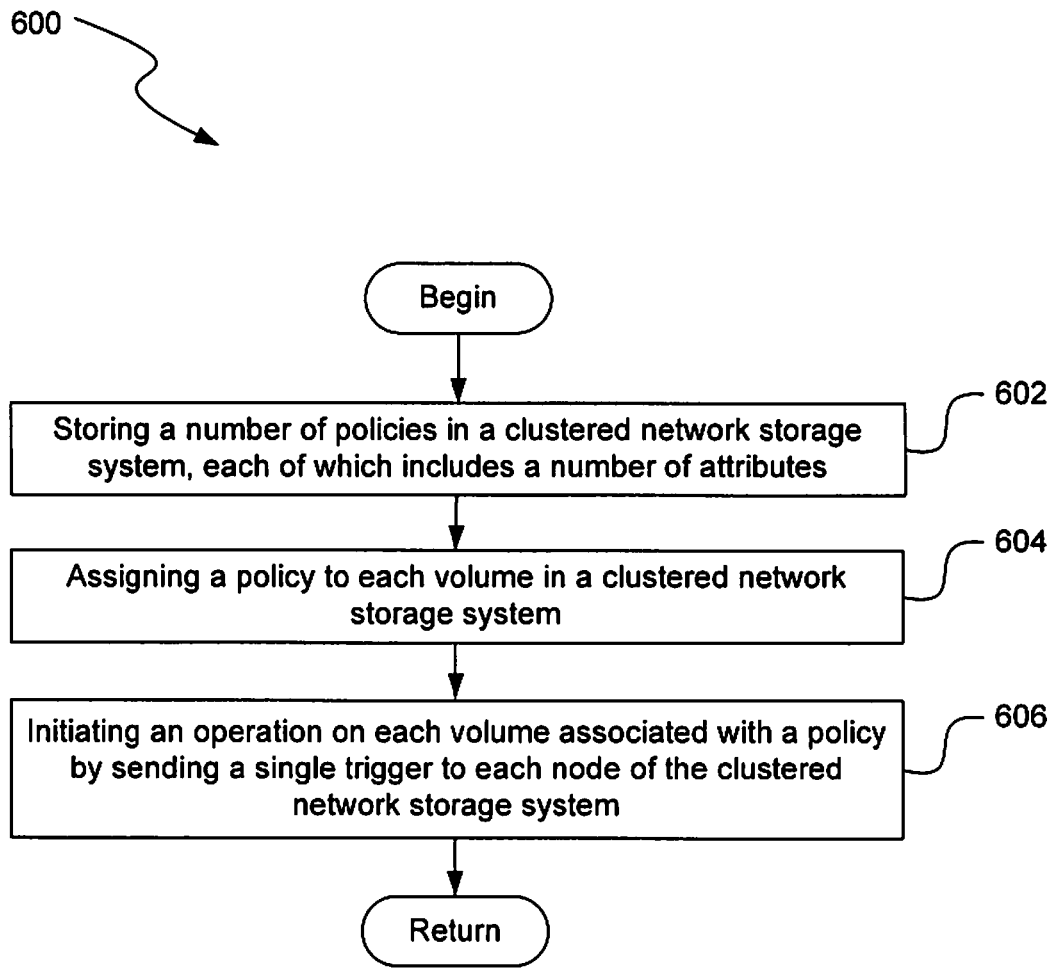
FIG. 6 is a flow diagram of a high level process for implementing policy based storage efficiency management on a node of a clustered network storage system.

FIG. 6 is a flow diagram of a high level process of policy based storage efficiency management. The process is organized as a sequence of operations in the flowchart 600. However, it should be understood that at least some of the operations associated with this process can potentially be reordered, supplemented, or substituted for while still performing the same overall technique.

Initially, at 602, a number of policies are stored in a clustered network storage system. At 604, multiple volumes in the clustered network storage system are assigned a policy. Finally, at 606, a job manager 502, in response to a scheduled event, initiates a storage efficiency operation by using a trigger message sent from a single M-host 218 to each node in the clustered network storage system. A more detailed description of the process follows.

Each of the policies stored in the clustered network storage system includes a number of storage efficiency attributes as described below. The policies are stored in a policy database 504, which can be included in the replicated database 220 of the M-host 218. The policy database 504 is available to all nodes of the cluster and allows management of the storage efficiency policies and attributes to be performed from any node in the cluster.

A user, e.g., a network administrator, can create a policy and cause it to be stored through several interfaces provided by the storage efficiency management framework. For example, a user can use a command line interface (CLI) command, an application programming interface (API), or a GUI (e.g., a web interface to a node) to create a policy. The specific details of such interfaces are not germane to the technique introduced here. The user, through the interface, can set the values for the attributes included in the policy. These attributes can include, a policy identifier (e.g., name, ID number, etc.), what storage efficiency operations are to be carried out under the policy, a policy schedule for such operations, and a duration or stop time for the operation. The user, as previously described, can manage the storage efficiency policies from any node in the cluster, via its M-host 218.

An illustrative policy created by a user can include the following policy attribute values. The policy identifier is assumed herein to be a policy name for ease of explanation, however, any policy identifier can be used. The policy name attribute can be descriptive of the time at which the associated operations are to run, for example, "nightly", or the policy name can be an arbitrary character string decided by the user. In the example of the "nightly" policy, the value for a deduplication operation attribute could be set to "yes" and the value for a compression operation attribute could be set to "no". A combination of storage efficiency operations can thus be selected in a single policy. The value for the schedule attribute in the example "nightly" policy could be, for example, a specific day and/or time, or it could be a time interval such as daily, nightly, etc. Similarly a value for the duration attribute of the storage efficiency operation, for example three hours, or a stop time, 3:00 A.M. can be included in the "nightly" policy. The "nightly" policy contains various attributes specified once by a user and can now be assigned to multiple volumes (by the assignment of the policy) without the user having to specify each attribute value again. A policy can include other attributes not specified in the example above.

After the user has input the policy attributes, the M-host 218 of the node where the user creates the policy checks the policy database 504 to determine whether a policy by the same name has already been created. If there is no policy by the same name, the M-host 218 creates a new entry in the policy database 504. If there is already a policy in the policy database 504 with the same name, an error message can be displayed to the user prompting the user to change the policy name and then the M-host 218 can create a new entry in the policy database 504 with the new name.

The job manager 502 maintains a schedule of jobs associated with various policies. This schedule can be part of the replicated database 220 which is available to all nodes in the cluster. The M-host 218 checks with its local job manager 502 to determine whether a job matching the policy schedule attributes assigned to the new policy exists in the job schedule. If there is a job with a matching schedule, the job manager 502 adds the new policy to the job with that schedule. If there is not currently a job that matches the policy schedule attributes in the new policy, the job manager 502 creates a new job and includes the new job in the schedule to run according to the policy schedule attributes. In one embodiment, a default job can be included in the schedule for the user, for example, a job whereby the policies associated with the job will be triggered every day at midnight. In one embodiment, the job manager can only delete a job from the schedule if it is not referenced by a storage efficiency policy, regardless of whether that policy is currently assigned to any volumes.

Once a policy has been created, the user can assign multiple volumes in the clustered network storage system that policy. This step saves a network administrator considerable time and effort because the policy contains all of the storage efficiency operation attributes that would otherwise have to be individually assigned to each volume. A mapping of the policies to the volumes maintained in each node is stored at the D-module 216 in each node.

A user can assign any policy from the policy database 504 to any volume 472 in the cluster from any M-host 218 in the cluster. For example, a user can assign the "nightly" policy from the above example to volume 472-1 from M-host 218-2 or 218-3 along with any other M-host in the cluster. The user can assign the storage efficiency policy "nightly" on volume 472-1 through a CLI command, an API, or a web interface. When a user assigns a policy to a volume, the M-host 218 checks with the volume location database (VLDB) (not shown) to determine the location of the volume 472-1, i.e., which D-module 216 owns that volume. The M-host 218 then sends a message to the node where the volume 472-1 is located. The message includes the policy and can also include the policy attribute values. The D-module 216-1 which owns the volume 472-1 receives the message through an API and records the policy for the volume in its data structure 506-1. The D-module 216 can also write the policy information to disk in the volume 472-1 in a storage efficiency metafile.

After a policy has been assigned to a volume, a user can modify the policy. The user can modify the policy for volume 472-1 using a CLI command, an API, or the web interface. Assume a user creates a second policy "daily" and wishes to assign this new policy to volume 472-1. The M-host 218 checks the VLDB to determine the location of the volume 472-1 and sends a message to the node where the volume is located. The message includes the volume and the new policy which is being assigned to that volume. The D-module 216-1 of the node where the volume 472-1 is located changes the entry in the data structure 506 from the "nightly" policy to the "daily" policy. The D-module 216-1 can also record the change in the storage efficiency metafile in the volume 472-1.

Along with user defined policies, the policy based storage efficiency framework can include a number of predefined policies. For example, a default policy, an auto policy, and a blank policy. The default policy can include a default set of attributes and can run on a default schedule. This default policy can be assigned to a volume whenever storage efficiency operations are enabled on the volume but no custom policy has been assigned. The auto policy may be triggered based on the amount of data that has been changed on a volume or another event that would trigger storage efficiency operations. The blank policy could be used by a network administrator if they do not want storage efficiency operations to run on the volume.

If a policy is no longer being used, a user can delete the policy. If a policy that is currently assigned to a volume is deleted, the storage efficiency operations on that volume would not be performed until the volume is assigned a new policy, or a default policy can be applied. However, in one embodiment, a policy cannot be deleted if it is assigned to any volume.

In response to a scheduled event, for example, a scheduled job, a job manager 502 in the cluster that has sufficient resources available, initiates a storage efficiency operation by sending a trigger message from a single M-host 218 to each node in the clustered network storage system. Sending a single trigger message per node improves CPU and bandwidth utilization when compared to the conventional method of sending a trigger message for each volume in the node, and is particularly advantageous when the communication takes place over a wide area network (WAN). For example, if a trigger message was sent for each volume in a node containing several hundred volumes, several hundred trigger messages would be sent to the node at the same time and consume a large amount of bandwidth. However, by sending a single trigger message to each node including which policy the storage efficiency operation is to be operated for, only a small fraction of the bandwidth is consumed.

Figure 10:
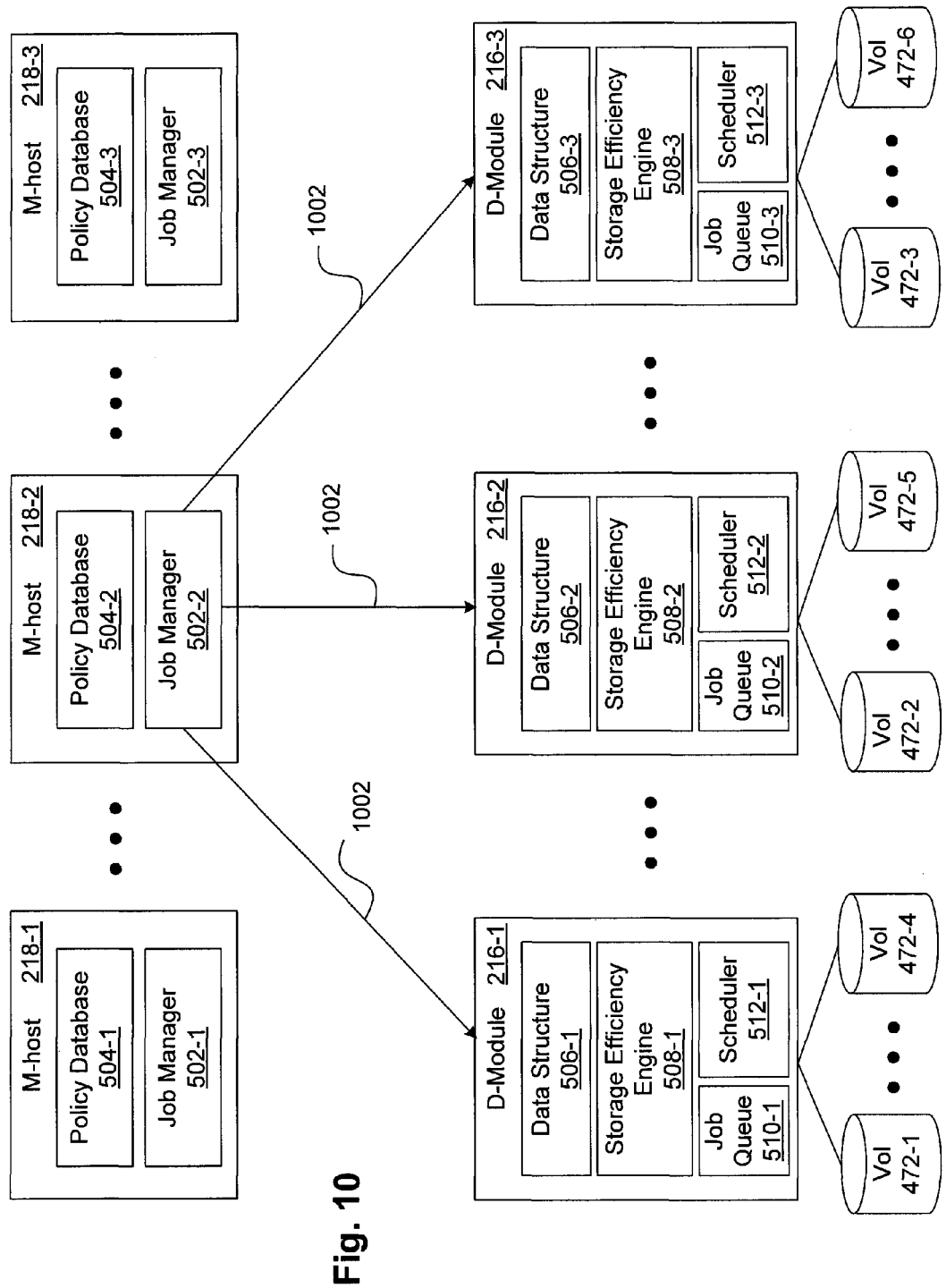
FIG. 10 illustrates a storage efficiency operation being initiated by a trigger message being sent from a single job manager to each node in the clustered network storage system.

A single trigger message being sent to each node is depicted in FIG. 10. As shown in FIG. 10, the job manager 502-2 is initiating the storage efficiency operation. The arrow 1002 represents a single trigger message sent from the job manager 502-2 to each node in the cluster. Thus, in the example of FIG. 10 only three trigger messages would need to be sent from the job manager 502-2 to initiate storage efficiency operations on potentially hundreds, or even thousands, of volumes in the clustered network storage system. Using conventional methods, hundreds, or even thousands, of trigger messages would need to be sent to initiate the same storage efficiency operations.

The trigger message contains the information necessary for the D-module 216 to determine which volumes 472 the storage efficiency operation is initiated for. For example, the trigger message can contain the policy name associated with the scheduled storage efficiency operation. The D-module 216 can then determine, from the information stored in the data structure 506, which volumes 472 have that policy assigned to them and the operation can be carried out on those volumes.

If the D-module 216 determines that it owns a volume 472 that has the policy designated in the trigger message assigned to it, and if the D-module has the resources available to execute the storage efficiency operation, the storage efficiency engine 508 executes the operation. However, if the D-module 216 is busy with other operations, the scheduler 512 on the D-module places the storage efficiency operation in a job queue 510 for execution when the D-module resources become available.

Figure 7A:
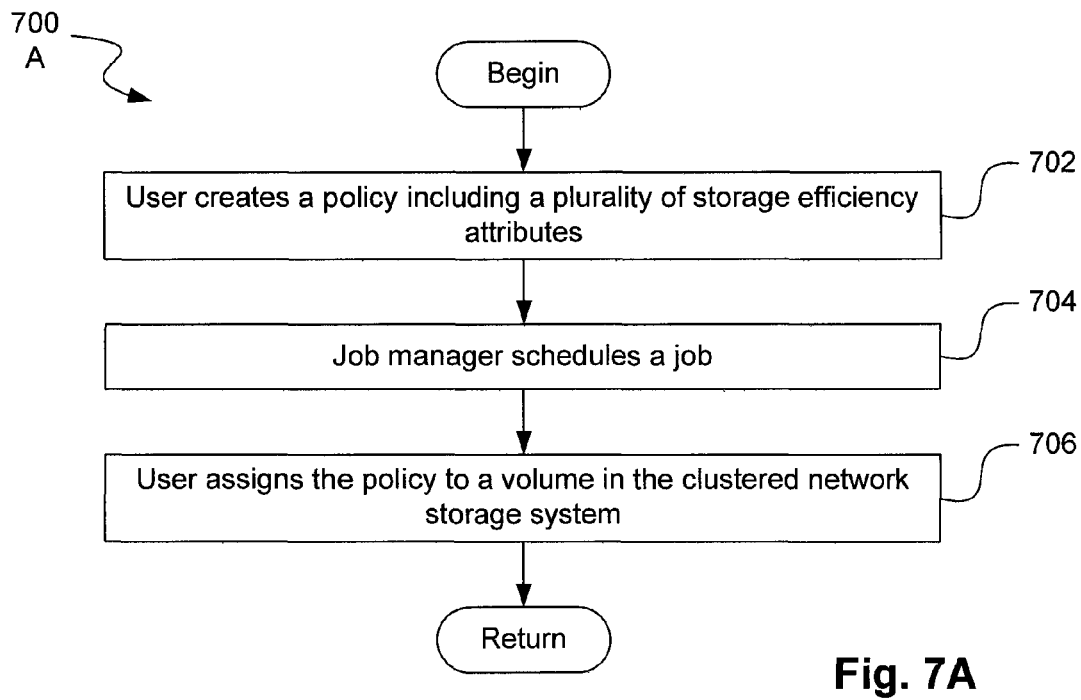
FIG. 7A is a flow diagram of an example of a creating and assigning a policy in a policy based storage efficiency framework according to the techniques introduced here.

FIG. 7A is a flow diagram of an example of a creating and assigning a policy in a policy based storage efficiency framework according to the techniques introduced here. The process is organized as a sequence of operations in the flowchart 700A. However, it should be understood that at least some of the operations associated with this process can potentially be reordered, supplemented, or substituted for while still performing the same overall technique.

The process 700A begins at 702 with a user creating a policy: In this example, assume the user has created three policies P1, P2, and P3 with schedules S1, S2, and S1, respectively.

As part of creating a policy, the process 700A continues, at 704, with the job manager 502 scheduling a job. In this example, the job manager 502 will schedule one job for schedule S1, which is associated with policies P1 and P3, and another job for schedule S2, which is associated with P2. In one embodiment, multiple schedules can be included in a single policy, e.g., one for deduplication operations and one for compression operations.

The process 700 continues to 706, where the user assigns a policy to a volume 472. In this example, assume that policy P1 has been assigned to volume 472-1, policy P2 has been assigned to volume 472-2, and policy P3 has been assigned to volume 472-3.

Figure 7B:
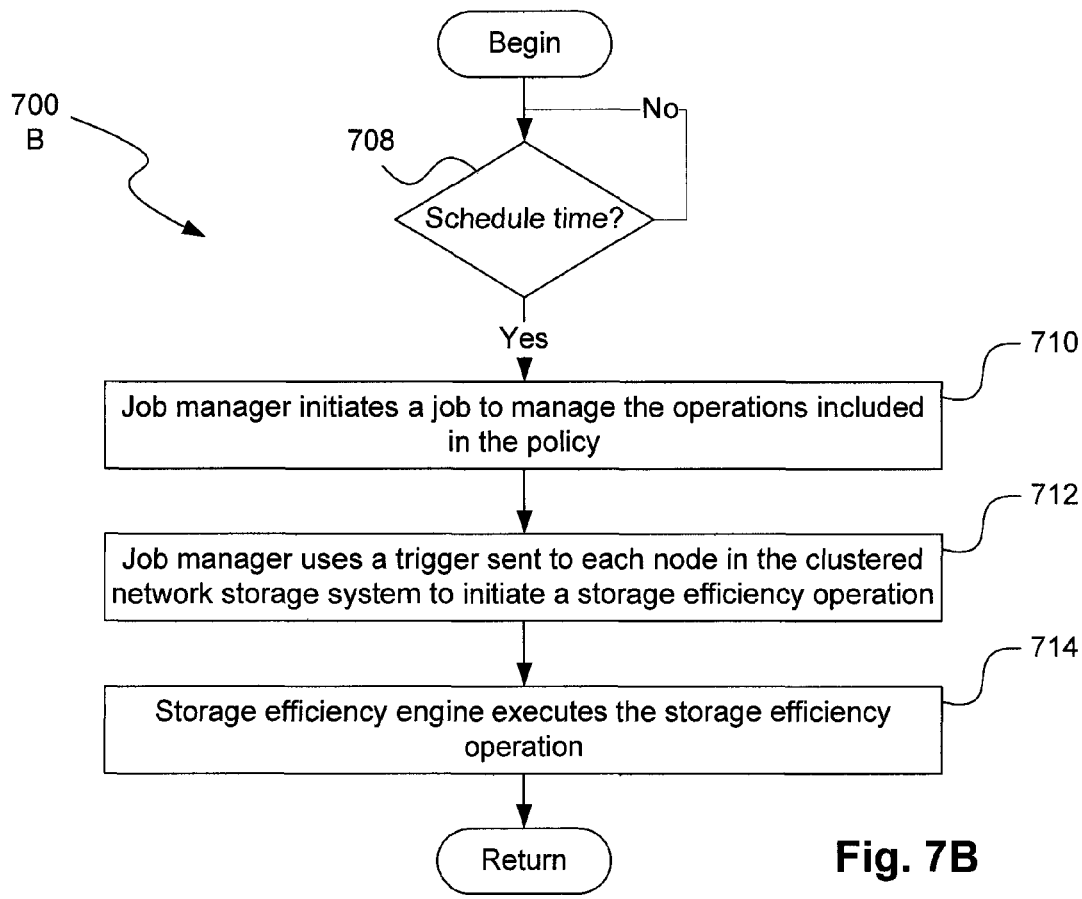
FIG. 7B is a flow diagram of an example of a storage efficiency operation being initiated by a policy based storage efficiency framework according to the techniques introduced here.

FIG. 7B is a flow diagram of an example of a storage efficiency operation being initiated by a policy based storage efficiency framework according to the techniques introduced here. The process is organized as a sequence of operations in the flowchart 700B. However, it should be understood that at least some of the operations associated with this process can potentially be reordered, supplemented, or substituted for while still performing the same overall technique.

The process begins with decision block 708 where the job manager waits for the schedule time to arrive. When the schedule time S1 arrives, 708-Yes, a job manager 502 in one of the nodes in the cluster that has sufficient resources, for example job manager 502-2, initiates a job, at 710, to manage the operations included in the policies associated with schedule S1. However, the job can be run on any node in the cluster. This feature allows the job manager 502 to run the job on a node that has resources available and thus provides for load balancing. Further, if the node on which the job is running fails, the job can automatically be taken over by another node in the cluster and restarted. The job, run by the job manager 502-2, checks with the policy database 502-2 and gets a list of all of the policies associated with schedule S1, in this example, policies P1 and P3. In one embodiment, two separate jobs may be created for a single policy, for example, one job for deduplication operations and one job for compression operations.

The process 700B continues, at 712, with the job manager 502-2 initiating a storage efficiency operation associated with scheduled policy by using a trigger message sent to each node in the clustered network storage system, as shown in FIG. 10. The trigger message includes an indication of one or more policies for which storage efficiency operations are to be run. In this example, the trigger message would include information indicating that the storage efficiency operations associated with policies P1 and P3 are to be performed. In one embodiment, the trigger message includes the type of storage efficiency operation(s) to be performed according to the policy.

At 714, in response to receiving the trigger message, the storage efficiency engine 508 of each node checks with its local data structure 506 to determine if the policy information in the trigger message matches a volume it services and what storage efficiency operations are associated with that policy. In this example, storage efficiency engine 508-1 executes a storage efficiency operation on volume 472-1 with the attributes included in policy P1. Similarly, storage efficiency engine 508-3 executes a storage efficiency operation on volume 472-3 with the attributes included in policy P3. However, while the data module 216-2 receives the trigger as well, no storage efficiency operation is executed by the storage efficiency engine 508-2, because no volume on that node is assigned a policy with schedule S1.

Figure 8:
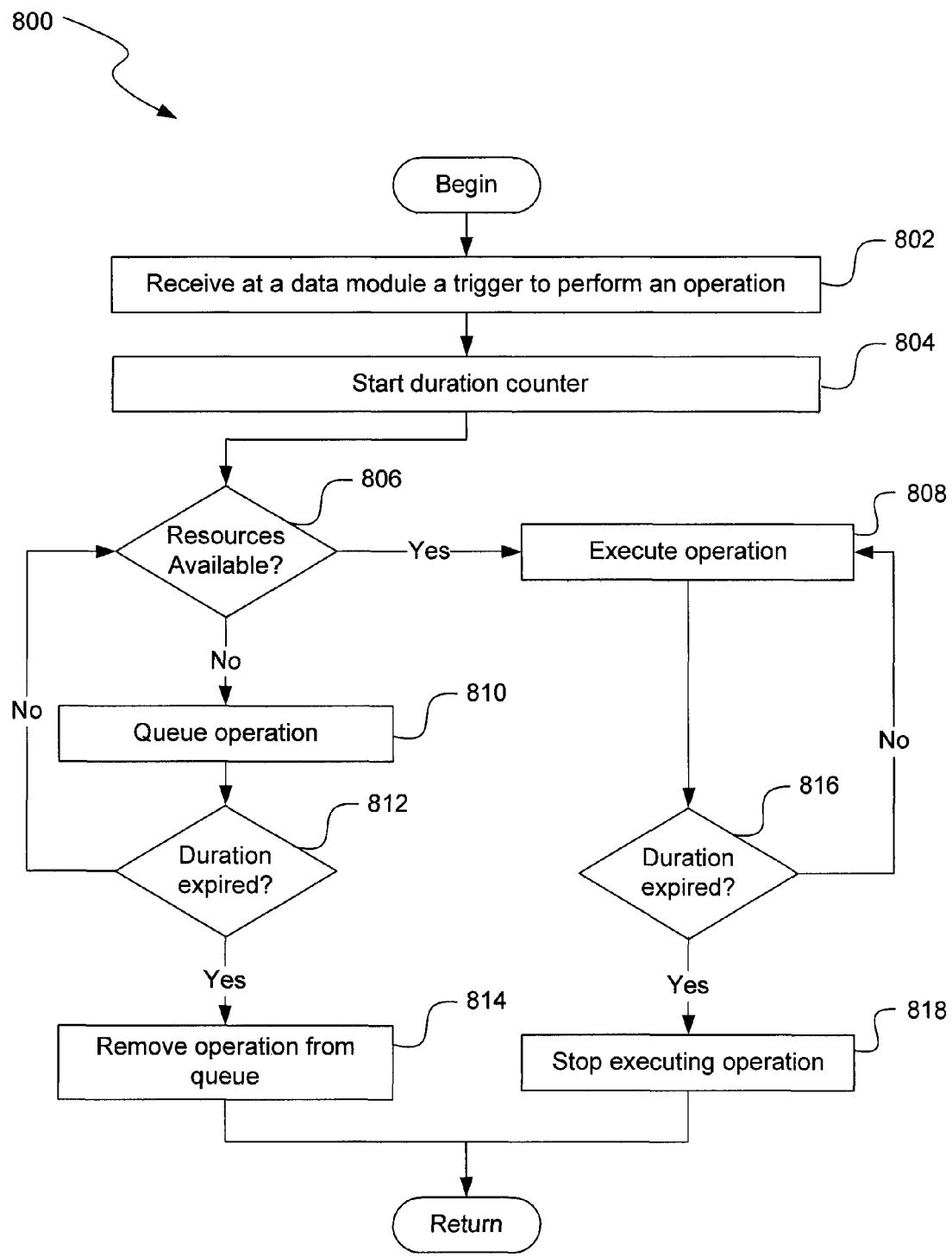
FIG. 8 is a flow diagram of an operation in a policy based storage efficiency management environment where a duration attribute is included in the policy.

FIG. 8 is a flow diagram of an operation in a policy based storage efficiency management environment where a duration attribute is included in the policy. The duration attribute represents a maximum amount of time for which the storage efficiency operation will be allowed to run. The duration can be specified, for example, in units of days, hours, and/or minutes. The process is organized as a sequence of operations in the flowchart 800. However, it should be understood that at least some of the operations associated with this process can potentially be reordered, supplemented, or substituted for while still performing the same overall technique.

Initially, at 802, each D-module 216 in the cluster receives a trigger from a job manager 502 to perform the operation(s) associated with the policy on the volumes 472 to which that policy is assigned. In one embodiment, the duration is included in the trigger message. In another embodiment, the duration is stored in the data structure 506 along with the other policy attributes and is not included in the trigger message. In response to receiving the trigger, the D-module 216 initializes a duration counter at 804. The duration counter begins from the time the operation is triggered, even if the operation enters a queue due to the D-module 216 being busy.

At 806, a scheduler 512 in the D-module 216 checks to determine whether the D-module has resources available to execute the operation. If the D-module 216 has sufficient resources available, 806-Yes, then, at 808, the storage efficiency engine 508 begins execution of the operation. However, if the D-module 216 does not have sufficient resources available to execute the operation, 806-No, then the operation is placed in a job queue 510, at 810, to wait for sufficient resources to become available.

After the operation has been queued, at 812, the scheduler 512 continuously checks the duration counter to determine whether the duration has expired. If the duration has not expired, 812-No, then, at 806, the scheduler 512 checks to see if sufficient resources have become available to execute the operation. If sufficient resources have become available, then, at 808, the operation is executed by the storage efficiency engine 508. However, if sufficient resources to execute the operation remain unavailable, then the operation remains in the queue and the process above is repeated. If the duration has expired, 812-Yes, the operation is removed from the queue, at 814, and remains unexecuted until the next scheduled process time.

Once an operation has begun execution, the scheduler 512 continuously checks the duration counter, at 816, to determine whether the duration has expired. If the duration has not expired, 816-No, the storage efficiency engine 508 continues to execute the operation until either the operation is completed or the duration expires, 816-Yes. If the duration expires prior to the operation being completed, at 818, the execution of the operation is stopped. If the operation is stopped before it was completed, the state of the operation can be saved and the operation can begin at the point where it left off when the next scheduled operation takes place.

In one embodiment a stop time attribute can be substituted for the duration attribute. This embodiment would use the schedule time as a start time and the stop time attribute as a stop time. The operation would be executed between the start time, or schedule time, and the stop time.

Figure 9:
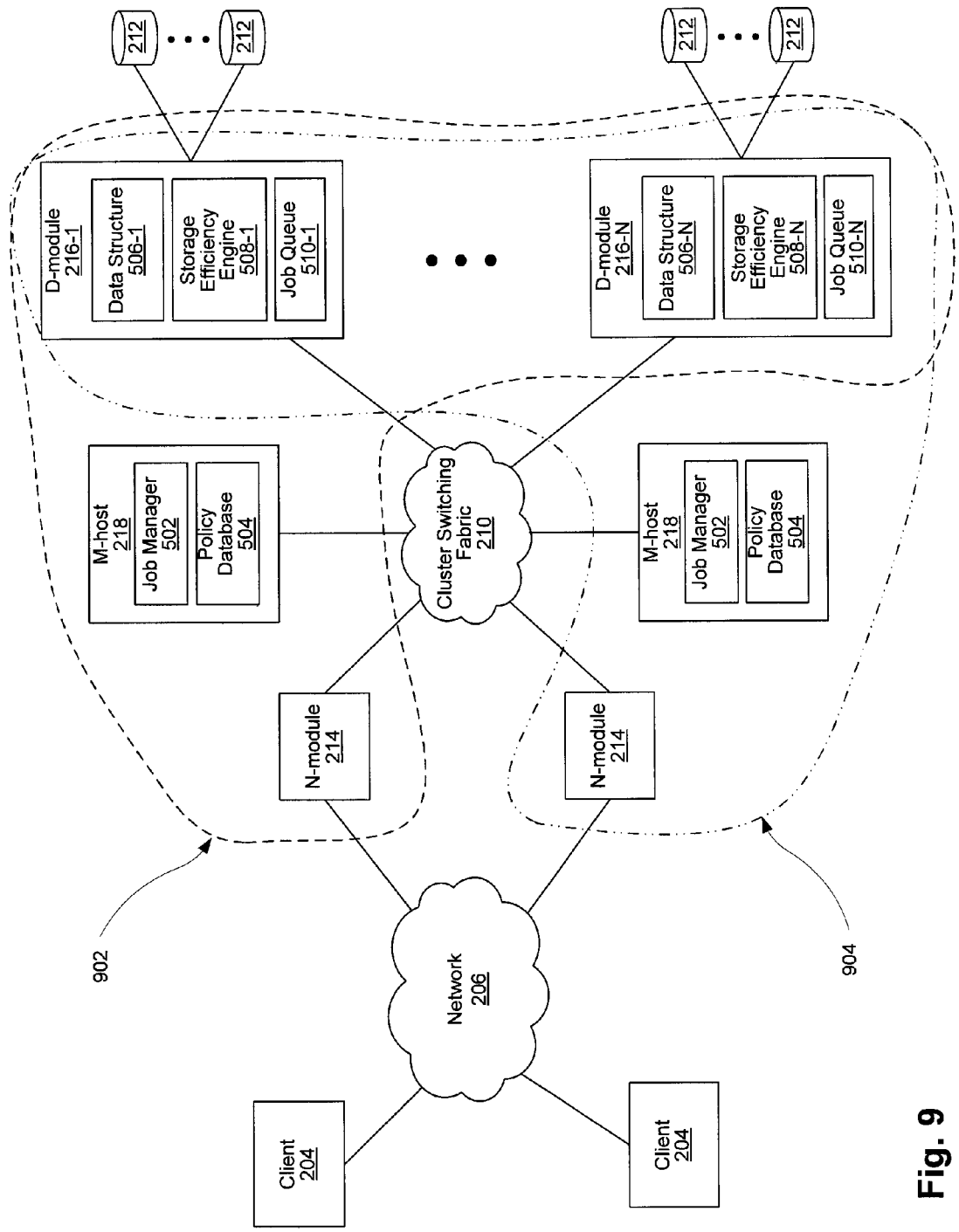
FIG. 9 illustrates an example of a clustered network storage system including a plurality of virtual servers and a policy based storage efficiency management framework.

FIG. 9 illustrates an example of a clustered network storage system including a plurality of virtual servers 902 and 904 and a policy based storage efficiency framework according to the techniques introduced here. Virtual servers allow the sharing of the underlying physical server resources (e.g. the processor and memory) between virtual servers while allowing each virtual server to run its own operating system. Multiple server operating systems that in the past would have to run on individual machines, in order to avoid interference or security issues, are now able to run on the same physical machine because of the functional isolation provided by a virtual server. This can be a more cost effective way to provide storage server solutions to multiple clients than providing separate physical server resources for each client.

The system of FIG. 9 includes a plurality of client systems 204, a plurality of virtual servers 902 and 904 implemented in a clustered network storage system, and a computer network 206 connecting the client systems 204 and the clustered network storage system. As shown in FIG. 9, each virtual server includes an N-module 214, an M-host 218, and can include volumes on a plurality of D-modules 216 which communicate through the cluster switching fabric 210. Each virtual server shown in this figure is associated with a separate M-host 218 but owns volumes on the plurality of common D-modules 216.

The policy based storage efficiency framework, as described above with reference to FIG. 5, works essentially the same way in the virtual server environment shown in FIG. 9. However, policy based management can also be integrated with a role based access control (RBAC) model where a virtual server administrator has read-only access to a predefined set of storage efficiency policies created by the cluster administrator and cannot create new policies. This allows the cluster administrator to delegate the task of managing storage efficiency to one or more virtual server administrators, while maintaining necessary constraints to ensure efficient cluster performance. For example, a cluster administrator can create policies which are scheduled to run during off-peak times when client traffic is low. Thus, a virtual server administrator can assign only policies that are restricted to run storage efficiency operations on a volume in such a way that does not interfere with client traffic.

In another example, because some storage efficiency operations require more processing power, a cluster administrator can create policies which have those operations disabled. These policies can then be assigned by a virtual server administrator managing volumes on a primary system (which has stricter performance requirements) such that the performance of the system is not degraded.

The techniques introduced above can be implemented by programmable circuitry programmed or configured by software and/or firmware, or they can be implemented by entirely by special-purpose "hardwired" circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
storing, in a clustered network storage system, a plurality of policies, each of which includes a plurality of attributes;
assigning a policy, of the plurality of policies, to each storage object of a plurality of storage objects distributed among a plurality of nodes in the clustered network storage system;
initiating an operation, according to the policy, on each of the plurality of storage objects distributed among the plurality of nodes, by using a single trigger sent from a management module in the clustered network storage system to each of the plurality of nodes;
determining, based on content of the trigger, the operation to be performed on the storage objects; and
determining, based on a mapping of which storage objects are assigned the policy, the storage objects on which to perform the operation.

2. The method of claim 1 further comprising:
storing in the clustered network storage system an indication of the attributes included in each policy of the plurality of policies.

3. The method of claim 2 further comprising:
storing in the clustered network storage system a mapping of policies to storage objects in the clustered network storage system.

4. The method of claim 3, wherein the clustered network storage system includes a data module configured to maintain a plurality of storage objects, and wherein the mapping of policies to storage objects is available to the data module which maintains the storage objects mapped in the data structure.

5. The method of claim 2, wherein the indication of the attributes included in each policy is available to each of a plurality of instances of a management module in the clustered network storage system.

6. The method of claim 1 further comprising:
queuing the operation on a storage object of the plurality of storage objects in a queue when a data module which maintains the storage object is operating at capacity.

7. The method of claim 6, wherein the plurality of attributes includes a duration limit for the operation associated with the policy.

8. The method of claim 7 further comprising:
removing the operation from the queue, prior to the operation being executed, when the duration limit for the operation is reached.

9. The method of claim 7 further comprising:
stopping the operation from executing when the duration limit for the operation is reached.

10. The method of claim 6 further comprising:
executing the operation on the storage object when the data module which maintains the storage object has resources available to execute the operation.

11. A method comprising:
creating a plurality of distinct storage efficiency policies, each storage efficiency policy including a plurality of storage efficiency attributes, wherein the storage efficiency attributes relate to storage efficiency management operations;
assigning, to each storage object of a plurality of storage objects distributed among a plurality of nodes in a clustered network storage system, a storage efficiency policy of the plurality of distinct storage efficiency policies;
storing in the clustered network storage system, an indication of the storage efficiency attributes included in each storage efficiency policy of the plurality of storage efficiency policies, wherein the indication of the storage efficiency attributes is available to each of a plurality of instances of a management module in the clustered network storage system;

storing in the clustered network storage system, a mapping of storage efficiency policies to storage objects in the clustered network storage system; and initiating a storage efficiency operation on each of the storage objects associated with a storage efficiency policy, according to the storage efficiency policy, by using a single trigger sent to each of the plurality of nodes from a single instance of the management module in the clustered network storage system.

12. The method of claim 11 further comprising;

modifying a storage efficiency policy from any instance of the management module in the clustered network storage system.

13. The method of claim 12 further comprising:

queuing the storage efficiency operation for a storage object of the plurality of storage objects in a queue when a data module which maintains the storage object is operating at capacity.

14. The method of claim 13 further comprising:

executing the storage efficiency operation when the data module which maintains the storage object has resources available to execute the storage efficiency operation.

15. The method of claim 13 further comprising:

removing the storage efficiency operation from the queue, prior to the storage efficiency operation being executed, when the duration of the storage efficiency operation is reached.

16. The method of claim 11 wherein the storage efficiency operation is a deduplication operation.

17. The method of claim 11 wherein the storage efficiency operation is a compression operation.

* * * * *